United States Patent
Zhang et al.

(10) Patent No.: US 12,146,044 B1
(45) Date of Patent: Nov. 19, 2024

(54) RED MUD-BASED COMPOSITE ASPHALT ANTI-AGING AGENT, AND PREPARATION METHOD THEREFOR AND USE THEREOF

(71) Applicant: SHANDONG UNIVERSITY, Shandong (CN)

(72) Inventors: Jizhe Zhang, Jinan (CN); Hongya Yue, Jinan (CN); Zixuan Gang, Jinan (CN); Minghui Chen, Jinan (CN); Jiandong Wu, Jinan (CN); Yufeng Bi, Jinan (CN); Run Xu, Jinan (CN); Zhanyong Yao, Jinan (CN)

(73) Assignee: SHANDONG UNIVERSITY, Jinan (CN)

(*) Notice: Subject to any disclaimer, the term of this patent is extended or adjusted under 35 U.S.C. 154(b) by 0 days.

(21) Appl. No.: 18/787,079

(22) Filed: Jul. 29, 2024

(30) Foreign Application Priority Data

Jan. 9, 2024 (CN) .......................... 202410027028.8

(51) Int. Cl.
| | |
|---|---|
| *C08K 13/08* | (2006.01) |
| *C08L 95/00* | (2006.01) |
| *C08K 3/22* | (2006.01) |
| *C08K 5/19* | (2006.01) |
| *C08K 5/5435* | (2006.01) |
| *C08K 11/00* | (2006.01) |

(52) U.S. Cl.
CPC .............. *C08K 13/08* (2013.01); *C08L 95/00* (2013.01); *C08K 2003/2241* (2013.01); *C08K 2003/2296* (2013.01); *C08K 5/19* (2013.01); *C08K 5/5435* (2013.01); *C08K 11/005* (2013.01); *C08K 2201/011* (2013.01); *C08K 2201/014* (2013.01); *C08L 2555/50* (2013.01)

(58) Field of Classification Search
CPC ........ C08K 13/08; C08K 5/19; C08K 5/5435; C08K 11/005; C08K 2003/2241; C08K 2003/2296; C08K 2201/011; C08K 2201/014; C08L 95/00; C08L 2555/50
See application file for complete search history.

(56) References Cited

U.S. PATENT DOCUMENTS

| | | | | |
|---|---|---|---|---|
| 4,410,589 A | * | 10/1983 | Muller ...................... | C08K 3/36 427/403 |
| 11,370,707 B1 | | 6/2022 | Li et al. | |
| 2009/0084287 A1 | * | 4/2009 | Partanen .................... | C10C 3/00 106/273.1 |
| 2011/0214796 A1 | * | 9/2011 | Avramidis .......... | C04B 24/2676 524/265 |

FOREIGN PATENT DOCUMENTS

| | | |
|---|---|---|
| CN | 109293990 A | 2/2019 |
| CN | 110642555 A | 1/2020 |
| CN | 111499247 A | 8/2020 |
| CN | 114538821 A | 5/2022 |
| KR | 101647097 B1 | 8/2016 |

OTHER PUBLICATIONS

Jin J, Chen B, Liu L, Liu R, Qian G, Wei H, Zheng J. A Study on Modified Bitumen with Metal Doped Nano-TiO2 Pillared Montmorillonite. Materials. 2019; 12(12):1910. https://doi.org/10.3390/ma12121910 (Year: 2019).*

Zhen Fu, Yujie Tang, Feng Ma, Yujie Wang, Ke Shi, Jiasheng Dai, Yingjie Hou, Jie Li, Rheological properties of asphalt binder modified by nano-TiO2/ZnO and basalt fiber, Construction and Building Materials, vol. 320, 2022, 126323, ISSN 0950-0618, https://doi.org/10.1016/j.conbuildmat.2022.126323. (Year: 2022).*

Jizhe Zhang, Zhanyong Yao, Kai Wang, Fei Wang, Hongguang Jiang, Ming Liang, Jincheng Wei, Gordon Airey, Sustainable utilization of bauxite residue (Red Mud) as a road material in pavements: a critical review, Construction and Building Materials, vol. 270, 2021, 121419, ISSN 0950-0618 (Year: 2021).*

Mar. 6, 2024 Office Action issued in Chinese Patent Application No. 202410027028.8.

Feb. 19, 2024 Office Action issued in Chinese Patent Application No. 202410027028.8.

* cited by examiner

*Primary Examiner* — Alexandra M Moore
(74) *Attorney, Agent, or Firm* — Oliff PLC

(57) ABSTRACT

The present invention relates to the technical field of road engineering construction and relates to a red mud-based composite asphalt anti-aging agent, and a preparation method therefor and use thereof. The red mud-based composite asphalt anti-aging agent consists of the following raw materials in parts by weight: 100 parts of red mud, 20-40 parts of a nano material, 10 parts of a cationic surfactant and 1 part of a silane coupling agent. The cationic surfactant is hexadecyl trimethyl ammonium bromide or octadecyl trimethyl ammonium bromide. The red mud-based composite anti-aging agent prepared by the present invention is added into asphalt to prepare a modified asphalt mortar so as to remarkably improve the anti-aging ability of the asphalt and realize the functional comprehensive utilization of the red mud. The problem that the addition of the red mud may lead to insufficient water stability of an asphalt mixture at present is solved.

9 Claims, No Drawings

RED MUD-BASED COMPOSITE ASPHALT ANTI-AGING AGENT, AND PREPARATION METHOD THEREFOR AND USE THEREOF

CROSS-REFERENCE TO RELATED APPLICATIONS

The present invention claims priority to Chinese Patent Application No. 202410027028.8, filed on Jan. 9, 2024 with the China National Intellectual Property Administration, titled "red mud-based composite asphalt anti-aging agent, and preparation method therefor and use thereof". The entire content of which is incorporated herein by reference and forms a part of the present invention for all purposes.

TECHNICAL FIELD

The present invention belongs to the technical field of road engineering materials and preparation methods thereof, and relates to a red mud-based composite asphalt anti-aging agent, and a preparation method therefor and use thereof.

BACKGROUND

Information for disclosing this background section is only for the purpose of increasing understanding of the general background of the present invention, and is not necessarily regarded as an acknowledgement or any form of suggestion that the information constitutes the prior art already known to those of ordinary skill in the art.

With the rapid economic development, road engineering construction has achieved significant achievements. However, as the service time is prolonged, an asphalt pavement is sufficiently contacted with oxygen and ultraviolet rays, and under the repeated action of vehicle load, the asphalt pavement is frequently damaged due to asphalt aging. At present, a method of adding anti-aging materials (antioxidants, ultraviolet absorbers, nano oxides and the like) is mainly adopted for the aging problem of the asphalt pavement. Although a certain anti-aging effect can be generated, certain shortcomings exist, such that an asphalt anti-aging agent with excellent performances and low price is urgently needed to be sought.

Red mud is an insoluble solid industrial waste discharged after alumina is extracted from bauxite by an alkaline method. The red mud piling not only occupies a large amount of land, but also brings potential safety hazards to surrounding soil bodies and underground water environment. The large-scale and reduction utilization of the red mud is still a worldwide problem. The red mud has a micro porous structure and surface activity, can be effectively bound to asphalt to form an ultraviolet light and oxygen blocking channel, and has the potential of improving the anti-aging performance and mechanical property of an asphalt mixture. Besides, the existing research shows that the red mud enhances the thermo-oxidative aging resistance of the asphalt by absorbing light components and blocking oxygen diffusion. However, after the red mud is mixed with the asphalt, more free asphalt is absorbed into structure asphalt due to the porous structure of the red mud, such that the low-temperature performance of the asphalt is reduced. Meanwhile, the red mud is easy to react with weakly acidic groups in the asphalt, which is shown macroscopically that an asphalt film is easy to strip by water, such that the adhesion of an asphalt-aggregate interface is reduced, namely the addition of the red mud may lead to insufficient water stability of the asphalt mixture. Therefore, patent CN114538821A discloses a composite modified red mud-based asphalt anti-aging agent, comprising: 40-70 parts of red mud, 1-3 parts of a nano material, 10-30 parts of a red mud modifying material, 1-2 parts of a chemical solvent and 10-20 parts of aromatic oil. Patent CN111499247A discloses a red mud-silicate composite anti-aging agent, an asphalt mixture, and a preparation method therefor and use thereof. The anti-aging agent comprises the following raw materials in parts by weight: 40-70 parts of red mud, 10-30 parts of a silicate material, 1-10 parts of slaked lime, 1-10 parts of white mud and 10-20 parts of aromatic oil. However, the anti-aging performance of the asphalt mixture still needs to be improved.

SUMMARY

In order to solve the problems, the present invention provides a red mud-based composite asphalt anti-aging agent which can improve the anti-aging performance of an asphalt mixture and realize high-value utilization of red mud at the same time. The present invention compounds and modifies the red mud using a nano material and a cationic surfactant. It is found that after the compounding, the addition of the red mud-based anti-aging agent can effectively improve the anti-aging performance of modified asphalt and the addition of the nano material can solve the problem of insufficient water stability caused by the addition of the red mud. A cationic surfactant is subjected to an ion exchange with ions on the surface of the red mud, such that large ion groups of the surfactant are exchanged to the surface of the red mud, the specific surface area and the pore volume of the red mud are increased, and the anti-aging performance is further improved.

In order to achieve the objectives, the present invention adopts the following technical solutions:

A first aspect of the present invention provides a red mud-based composite asphalt anti-aging agent, consisting of the following raw materials in parts by weight: 100 parts of red mud, 20-40 parts of a nano material, 10 parts of a cationic surfactant and 1 part of a silane coupling agent, wherein the cationic surfactant is hexadecyl trimethyl ammonium bromide or octadecyl trimethyl ammonium bromide.

Further, the red mud is prepared by a sintering process.

Further, the red mud can also be prepared by a Bayer process.

Further, the nano material is nano zinc oxide or nano titanium dioxide. The high-temperature performance and water stability of an asphalt mixture can be improved using the nano material.

Further, the silane coupling agent is (3-Glycidoxypropyl) trimethoxysilane (KH-560). The silane coupling agent can enable the red mud to be evenly dispersed in the asphalt and the bonding interface of asphalt mortar and an aggregate to be more complete under the soaking condition, and reduces the adhesion damage of the asphalt mortar and the aggregate, namely the addition of the silane coupling agent can improve the interface strength and water stability of the asphalt-aggregate.

It should be noted that the silane coupling agent of the present invention may further be replaced using a titanate coupling agent or an aluminate coupling agent.

A second aspect of the present invention provides a method for preparing a red mud-based composite asphalt anti-aging agent, comprising:

drying and crushing red mud for later use;

evenly mixing the dried and crushed red mud with water to obtain a red mud slurry;

adding a cationic surfactant into the red mud slurry for an ion exchange reaction, after the reaction is completed, performing suction filtration, drying and grinding the resulting precipitate, then adding a nano material, and evenly mixing same to obtain a red mud nano material powder; and spraying a coupling agent hydrolysate on the surface of the red mud nano material powder for modification, pouring out the resulting mixture after the modification is completed, performing reaction at room temperature, and then performing drying, crushing and grinding to obtain the finished product.

Further, the ion exchange reaction is performed while stirring at 80° C. for 3 h.

Further, a method for preparing the coupling agent hydrolysate is adding a silane coupling agent into water and stirring same until hydrolysis is completed.

Preferably, the mass ratio of the silane coupling agent to the water is 1: (9-12).

More specifically, the method for preparing a red mud-based composite asphalt anti-aging agent comprises:

(1) drying and crushing red mud for later use;

(2) mixing the red mud with deionized water at the liquid-solid ratio of 20:1 and stirring same for 30 min;

(3) adding a cationic surfactant according to the ratio of the red mud to the surfactant;

(4) after the addition is completed, stirring the resulting mixture at a constant temperature of 80° C. for 3 h, performing suction filtration, placing the resulting precipitate in an oven at 100° C. for drying and grinding, adding a certain amount of a nano material according to the ratio of the red mud to the nano material, and sufficiently stirring same for 1 h until a red mud nano material powder is uniform;

(5) adding a certain amount of a silane coupling agent to a water solution (the mass ratio of the silane coupling agent to the water is 1:9) and sufficiently stirring same for 30 min using a mixer to obtain a colorless and transparent solution, namely hydrolysis is completed; and (6) evenly spraying the coupling agent hydrolysate obtained in step 5 on the surface of the red mud nano material powder for modification, pouring out the resulting mixture after the modification is completed, placing the mixture at room temperature for reaction for 30 min, then placing the resulting reaction product in the oven at 105° C. until completely dry, and finally crushing and grinding the powder to obtain the red mud-based composite asphalt anti-aging agent.

A third aspect of the present invention provides a modified asphalt mortar, consisting of the following raw materials in parts by weight: 94-98 parts of asphalt and 2-6 parts of the red mud-based composite asphalt anti-aging agent.

Preferably, the asphalt is 70 penetration grade base asphalt.

It should be noted that the present invention has no special limitation on the types of asphalt as long as the asphalt meets the requirements of Technical Specification for Construction of Highway Asphalt Pavements (JTGF40-2004), for example, SBS modified asphalt can also be used.

A fourth aspect of the present invention provides a method for preparing the modified asphalt mortar, comprising:

heating and melting asphalt, then adding the red mud-based composite asphalt anti-aging agent, and evenly mixing same to obtain the modified asphalt mortar.

Beneficial Effects of the Present Invention (1) The red mud is chemically modified using the cationic surfactant in the present invention. Since the red mud is cation-exchangeable, large ion groups on the surfactant are exchanged to the surface of the red mud through an ion exchange, such that the purpose of increasing the specific surface area and pore volume of the red mud is achieved and finally the formation of an ultraviolet light and oxygen blocking channel is realized, thereby improving the anti-aging performance and mechanical property of the asphalt mixture.

(2) Since the addition of the red mud may reduce the water stability of the asphalt, the problem of insufficient water stability is solved by compounding the nano material with the red mud. At the same time, the nano material is used to absorb ultraviolet rays so as to further improve the anti-aging ability of the red mud-based composite anti-aging agent.

(3) The silane coupling agent is used for surface modification on the mixture of the red mud and the nano material in the present invention. One end of the silane coupling agent can be subjected to hydrolysis reaction with hydroxyl on the surface of the red mud to generate a covalent bond and the other end of the silane coupling agent and an organic functional group of base asphalt form a stationary phase through a chemical reaction so as to enable the mixed powder to be better dissolved and dispersed into the asphalt.

(4) The red mud-based composite anti-aging agent prepared by the present invention can remarkably improve the thermo-oxidative aging resistance and ultraviolet aging resistance of the asphalt, prolong the service time of an asphalt pavement and reduce the road maintenance cost. The red mud-based composite asphalt anti-aging agent provided by the present invention mainly comprises the red mud, the nano material, the cationic surfactant and the silane coupling agent. The red mud is used as a main component to prepare the asphalt anti-aging agent so as to realize utilization of the red mud, which is an important direction for improving the resource utilization efficiency of a large amount of solid wastes and promoting the innovative development of the comprehensive utilization of the large amount of solid wastes.

(5) The red mud-based anti-aging agent prepared by the present invention further expands the specific surface area and pore volume of the red mud by the organic modification on the basis of the anti-aging principle of the red mud, such that the red mud can absorb more light components, delay the volatilization of the light components in the aging process, and delay the aging time.

DETAILED DESCRIPTION

It should be pointed out that the following detailed description is illustrative and is intended to provide further explanation of the present invention. Unless otherwise specified, all technical and scientific terms used in the present invention have the same meaning as commonly understood by one of ordinary skill in the technical field to which the present invention belongs.

The present invention will be further described below in detail with reference to specific examples, and it should be pointed out that the specific examples are an explanation of the present invention, not a limitation.

The amount of each raw material is in parts by weight in the following examples.

Example 1

1. A method for preparing a red mud-based composite asphalt anti-aging agent comprised:
   (1) red mud prepared by a sintering process was placed in an oven at 100° C. for drying for 3 h;
   (2) 100 parts of the red mud prepared by a sintering process was mixed with deionized water at the liquid-solid ratio of 20:1 and stirred for 30 min;
   (3) 10 parts of octadecyl trimethyl ammonium bromide was added according to the ratio of the red mud to the cationic surfactant;
   (4) after the addition was completed, the resulting mixture was stirred at a constant temperature of 80° C. for 3 h, suction filtration, drying and grinding were performed, 40 parts of nano zinc oxide was added according to the ratio of the red mud to the nano material, and the mixture was placed in a solid mixer to be stirred at a rotating speed of 1,500 rpm for 50 min until a red mud nano material powder was uniform;
   (5) 1 part of KH-550 was added to a water solution (the mass ratio of the silane coupling agent to the water was 1:9) and sufficiently stirred for 30 min using a mixer to obtain a colorless and transparent solution, namely hydrolysis was completed; and
   (6) the KH-550 hydrolysate obtained in step 5 was evenly sprayed on the surface of the red mud nano material powder for modification, the resulting mixture was poured out after the modification was completed, the mixture was placed at room temperature for reaction for 30 min, then the resulting reaction product was placed in the oven at 105° C. until completely dry, and finally the powder was crushed and ground finely to the particle size required on a filler in the Technical Specification for Construction of Highway Asphalt Pavements (JTGF40-2004), and the powder was evenly stirred to obtain the organic red mud-based anti-aging agent.

2. A method for preparing a modified asphalt mortar comprised:
   (1) weighing of raw materials: the following components were weighed in parts by weight: 94 parts of 70 penetration grade base asphalt and 6 parts of the red mud-based composite asphalt anti-aging agent, wherein each technical indicator of each raw material meets the relevant requirements in the Technical Specification for Construction of Highway Asphalt Pavements (JTGF40-2004); and
   (2) a shear mixer was started, the 70 penetration grade base asphalt was heated at 150° C. for 3 h until molten, and then the red mud-based composite asphalt anti-aging agent prepared in the present example was proportionally added and stirred for 1 h using the mixer until the mixture was evenly mixed at a stirring speed of 300 r/min and a stirring temperature of 130° C. to obtain the modified asphalt mortar.

Example 2

1. A method for preparing a red mud-based composite asphalt anti-aging agent comprised:
   (1) red mud prepared by a sintering process was placed in an oven at 100° C. for drying for 3 h;
   (2) 100 parts of the red mud prepared by a sintering process was mixed with deionized water at the liquid-solid ratio of 20:1 and stirred for 30 min;
   (3) 10 parts of hexadecyl trimethyl ammonium bromide was added according to the ratio of the red mud to the cationic surfactant;
   (4) after the addition was completed, the resulting mixture was stirred at a constant temperature of 80° C. for 3 h, suction filtration, drying and grinding were performed, 40 parts of nano titanium dioxide was added according to the ratio of the red mud to the nano material, and the mixture was placed in a solid mixer to be stirred at a rotating speed of 1,500 rpm for 50 min until a red mud nano material powder was uniform;
   (5) 1 part of KH-550 was added to a water solution (the mass ratio of the silane coupling agent to the water was 1:9) and sufficiently stirred for 30 min using a mixer to obtain a colorless and transparent solution, namely hydrolysis was completed; and
   (6) the KH-550 hydrolysate obtained in step 5 was evenly sprayed on the surface of the red mud nano material powder for modification, the resulting mixture was poured out after the modification was completed, the mixture was placed at room temperature for reaction for 30 min, then the resulting reaction product was placed in the oven at 105° C. until completely dry, and finally the powder was crushed and ground finely to the particle size required on a filler in the Technical Specification for Construction of Highway Asphalt Pavements (JTGF40-2004), and the powder was evenly stirred to obtain the organic red mud-based anti-aging agent.

2. A method for preparing a modified asphalt mortar comprised:
   (1) weighing of raw materials: the following components were weighed in parts by weight: 95 parts of 70 penetration grade base asphalt and 5 parts of the red mud-based composite asphalt anti-aging agent, wherein each technical indicator of each raw material meets the relevant requirements in the Technical Specification for Construction of Highway Asphalt Pavements (JTGF40-2004); and
   (2) a shear mixer was started, the 70 penetration grade base asphalt was heated at 150° C. for 3 h until molten, and then the red mud-based composite asphalt anti-aging agent prepared in the present example was proportionally added and stirred for 1 h using the mixer until the mixture was evenly mixed at a stirring speed of 300 r/min and a stirring temperature of 130° C. to obtain the modified asphalt mortar.

Example 3

1. A method for preparing a red mud-based composite asphalt anti-aging agent comprised:
   (1) red mud prepared by a sintering process was placed in an oven at 100° C. for drying for 3 h;
   (2) 100 parts of the red mud prepared by a sintering process was mixed with deionized water at the liquid-solid ratio of 20:1 and stirred for 30 min;

(3) 10 parts of octadecyl trimethyl ammonium bromide was added according to the ratio of the red mud to the cationic surfactant;
(4) after the addition was completed, the resulting mixture was stirred at a constant temperature of 80° C. for 3 h, suction filtration, drying and grinding were performed, 30 parts of nano zinc oxide was added according to the ratio of the red mud to the nano material, and the mixture was placed in a solid mixer to be stirred at a rotating speed of 1,500 rpm for 50 min until a red mud nano material powder was uniform;
(5) 1 part of KH-550 was added to a water solution (the mass ratio of the silane coupling agent to the water was 1:9) and sufficiently stirred for 30 min using a mixer to obtain a colorless and transparent solution, namely hydrolysis was completed; and
(6) the KH-550 hydrolysate obtained in step 5 was evenly sprayed on the surface of the red mud nano material powder for modification, the resulting mixture was poured out after the modification was completed, the mixture was placed at room temperature for reaction for 30 min, then the resulting reaction product was placed in the oven at 105° C. until completely dry, and finally the powder was crushed and ground finely to the particle size required on a filler in the Technical Specification for Construction of Highway Asphalt Pavements (JTGF40-2004), and the powder was evenly stirred to obtain the organic red mud-based anti-aging agent.

2. A method for preparing a modified asphalt mortar comprised:
(1) weighing of raw materials: the following components were weighed in parts by weight: 97 parts of 70 penetration grade base asphalt and 3 parts of the red mud-based composite asphalt anti-aging agent, wherein each technical indicator of each raw material meets the relevant requirements in the Technical Specification for Construction of Highway Asphalt Pavements (JTGF40-2004); and
(2) a shear mixer was started, the 70 penetration grade base asphalt was heated at 150° C. for 3 h until molten, and then the red mud-based composite asphalt anti-aging agent prepared in the present example was proportionally added and stirred for 1 h using the mixer until the mixture was evenly mixed at a stirring speed of 300 r/min and a stirring temperature of 130° C. to obtain the modified asphalt mortar.

Example 4

1. A method for preparing a red mud-based composite asphalt anti-aging agent comprised:
(1) red mud prepared by a Bayer process was placed in an oven at 100° C. for drying for 3 h;
(2) 100 parts of the red mud prepared by a Bayer process was mixed with deionized water at the liquid-solid ratio of 20:1 and stirred for 30 min;
(3) 10 parts of hexadecyl trimethyl ammonium bromide was added according to the ratio of the red mud to the cationic surfactant;
(4) after the addition was completed, the resulting mixture was stirred at a constant temperature of 80° C. for 3 h, suction filtration, drying and grinding were performed, 30 parts of nano zinc oxide was added according to the ratio of the red mud to the nano material, and the mixture was placed in a solid mixer to be stirred at a rotating speed of 1,500 rpm for 50 min until a red mud nano material powder was uniform;
(5) 1 part of KH-560 was added to a water solution (the mass ratio of the silane coupling agent to the water was 1:9) and sufficiently stirred for 30 min using a mixer to obtain a colorless and transparent solution, namely hydrolysis was completed; and
(6) the KH-560 hydrolysate obtained in step 5 was evenly sprayed on the surface of the red mud nano material powder for modification, the resulting mixture was poured out after the modification was completed, the mixture was placed at room temperature for reaction for 30 min, then the resulting reaction product was placed in the oven at 105° C. until completely dry, and finally the powder was crushed and ground finely to the particle size required on a filler in the Technical Specification for Construction of Highway Asphalt Pavements (JTGF40-2004), and the powder was evenly stirred to obtain the organic red mud-based anti-aging agent.

2. A method for preparing a modified asphalt mortar comprised:
(1) weighing of raw materials: the following components were weighed in parts by weight: 98 parts of 70 penetration grade base asphalt and 2 parts of the red mud-based composite asphalt anti-aging agent, wherein each technical indicator of each raw material meets the relevant requirements in the Technical Specification for Construction of Highway Asphalt Pavements (JTGF40-2004); and
(2) a shear mixer was started, the 70 penetration grade base asphalt was heated at 150° C. for 3 h until molten, and then the red mud-based composite asphalt anti-aging agent prepared in the present example was proportionally added and stirred for 1 h using the mixer until the mixture was evenly mixed at a stirring speed of 300 r/min and a stirring temperature of 130° C. to obtain the modified asphalt mortar.

Example 5

1. A method for preparing a red mud-based composite asphalt anti-aging agent comprised:
(1) red mud prepared by a sintering process was placed in an oven at 100° C. for drying for 3 h;
(2) 100 parts of the red mud prepared by a sintering process was mixed with deionized water at the liquid-solid ratio of 20:1 and stirred for 30 min;
(3) 10 parts of octadecyl trimethyl ammonium bromide was added according to the ratio of the red mud to the cationic surfactant;
(4) after the addition was completed, the resulting mixture was stirred at a constant temperature of 80° C. for 3 h, suction filtration, drying and grinding were performed, 20 parts of nano titanium dioxide was added according to the ratio of the red mud to the nano material, and the mixture was placed in a solid mixer to be stirred at a rotating speed of 1,500 rpm for 50 min until a red mud nano material powder was uniform;
(5) 1 part of KH-560 was added to a water solution (the mass ratio of the silane coupling agent to the water was 1:9) and sufficiently stirred for 30 min using a mixer to obtain a colorless and transparent solution, namely hydrolysis was completed; and
(6) the KH-560 hydrolysate obtained in step 5 was evenly sprayed on the surface of the red mud nano material powder for modification, the resulting mixture was poured out after the modification was completed, the mixture was placed at room temperature for reaction for 30 min, then the resulting reaction product was placed in the oven at 105° C. until completely dry, and finally the powder was crushed and ground finely to the particle size required on a filler in the Technical Specification for Construction of Highway Asphalt Pavements (JTGF40-2004), and the powder was evenly stirred to obtain the organic red mud-based anti-aging agent.

2. A method for preparing a modified asphalt mortar comprised:

(1) weighing of raw materials: the following components were weighed in parts by weight: 98 parts of 70 penetration grade base asphalt and 2 parts of the red mud-based composite asphalt anti-aging agent, wherein each technical indicator of each raw material meets the relevant requirements in the Technical Specification for Construction of Highway Asphalt Pavements (JTGF40-2004); and (2) a shear mixer was started, the 70 penetration grade base asphalt was heated at 150° C. for 3 h until molten, and then the red mud-based composite asphalt anti-aging agent prepared in the present example was proportionally added and stirred for 1 h using the mixer until the mixture was evenly mixed at a stirring speed of 300 r/min and a stirring temperature of 130° C. to obtain the modified asphalt mortar.

Comparative Example 1

1. The preparation of a red mud-based composite asphalt anti-aging agent was the same as that in example 1, except that no nano material was added.
2. The preparation of a modified asphalt mortar was the same as that in example 1, except that the modifier used was the red mud-based composite asphalt anti-aging agent prepared in step 1 of the present comparative example.

Comparative Example 2

1. The preparation of a red mud-based composite asphalt anti-aging agent was the same as that in example 1, except that a cationic surfactant was not used for treatment.
2. The preparation of a modified asphalt mortar was the same as that in example 1, except that the modifier used was the red mud-based composite asphalt anti-aging agent prepared in step 1 of the present comparative example.

Comparative Example 3

1. The preparation of a red mud-based composite asphalt anti-aging agent was the same as that in example 1, except that no coupling agent was added.
2. The preparation of a modified asphalt mortar was the same as that in example 1, except that the modifier used was the red mud-based composite asphalt anti-aging agent prepared in step 1 of the present comparative example.

Comparative Example 4

1. The preparation of a red mud-based composite asphalt anti-aging agent was the same as that in example 1, except that no red mud was added.
2. The preparation of a modified asphalt mortar was the same as that in example 1, except that the modifier used was the red mud-based composite asphalt anti-aging agent prepared in step 1 of the present comparative example.

Comparative Example 5

1. A red mud-based composite asphalt anti-aging agent was not prepared.
2. The preparation of a modified asphalt mortar was the same as that in example 1, except that no red mud-based composite asphalt anti-aging agent was added, but the same amount of mineral powder was added.

Comparative Example 6

A red mud-based asphalt anti-aging agent and a modified asphalt mortar were prepared using the method in CN114538821A.

The anti-aging performances of the asphalt mortar of examples 1-5 and comparative examples 1-5 were evaluated with reference to the test flow of the Standard Test Methods of Bitumen and Bituminous Mixtures for Highway Engineering (JTGE20-2011). The specific evaluation indicators were shown in Table 1.

TABLE 1

Test results of anti-aging performances of asphalt mortar

| Example No. | Phase angle aging index | Complex modulus aging index |
| --- | --- | --- |
| Example 1 | 0.98 | 1.21 |
| Example 2 | 0.93 | 1.52 |
| Example 3 | 0.97 | 1.34 |
| Example 4 | 0.87 | 1.78 |
| Example 5 | 0.95 | 1.58 |
| Comparative example 1 | 0.91 | 1.40 |
| Comparative example 2 | 0.90 | 1.30 |
| Comparative example 3 | 0.96 | 1.38 |
| Comparative example 4 | 0.88 | 1.73 |
| Comparative example 5 | 0.81 | 1.89 |

It can be seen from the test results of the asphalt mortar that compared with the test results of comparative examples 1-5, (1) the phase angle aging index of the modified asphalt prepared by the method provided by the present invention was remarkably higher than that of the modified asphalt prepared in comparative example 5 without addition of the anti-aging agent;

(2) the complex modulus aging index of the modified asphalt prepared by the method provided by the present invention was remarkably lower than that of the modified asphalt prepared in comparative example 5 without addition of the anti-aging agent;

(3) the performance of the modified anti-aging agent prepared by the method provided by the present invention was remarkably improved, indicating that the method provided by the present invention can remarkably improve the anti-aging performance of the asphalt; and (4) the preparation principle of the present invention was different from that of patent CN114538821A: in the present invention, the ultraviolet aging resistance was improved by using the cationic surfactant and adding the nano material, and the problem of insufficient water stability caused by the red mud was solved; and in patent CN114538821A, the red mud-based asphalt anti-aging agent functioned only by the physical compounding of the red mud and the nano material. The red mud-based asphalt anti-aging agent prepared by the present invention had better aging indexes and the modified material disclosed in patent CN114538821A was not needed, such that the anti-aging agent had better compatibility with the asphalt and the problem of insufficient water stability caused by the red mud can be effectively solved. In conclusion, the red mud-based asphalt anti-aging agent developed by the present invention had a better comprehensive effect.

The above description is merely preferred examples of the present invention and is not intended to limit the present invention, and various changes and modifications may be made by those skilled in the art. Any modifications, equivalent substitutions, improvements and the like made within the spirit and principle of the present invention should be included within the protection scope of the present invention.

The invention claimed is:

1. A red mud-based composite asphalt anti-aging agent, consisting of the following raw materials in parts by weight: 100 parts of red mud, 20-40 parts of a nano material, 10 parts of a cationic surfactant and 1 part of a silane coupling agent, wherein
the cationic surfactant is hexadecyl trimethyl ammonium bromide or octadecyl trimethyl ammonium bromide; and
the nano material is nano zinc oxide or nano titanium dioxide.

2. The red mud-based composite asphalt anti-aging agent according to claim 1, wherein the red mud is prepared by a sintering process.

3. The red mud-based composite asphalt anti-aging agent according to claim 1, wherein the silane coupling agent is (3-Glycidoxypropyl) trimethoxysilane (KH-560).

4. A method for preparing a red mud-based composite asphalt anti-aging agent according to claim 1, comprising:
drying and crushing red mud for later use;
evenly mixing the dried and crushed red mud with water to obtain a red mud slurry;
adding a cationic surfactant into the red mud slurry for an ion exchange reaction, after the reaction is completed, performing suction filtration, drying and grinding the resulting precipitate, then adding a nano material, and evenly mixing same to obtain a red mud nano material powder; and
spraying a silane coupling agent hydrolysate on the surface of the red mud nano material powder for modification, pouring out the resulting mixture after the modification is completed, performing reaction at room temperature, and then performing drying, crushing and grinding to obtain the finished product.

5. The method for preparing a red mud-based composite asphalt anti-aging agent according to claim 4, wherein the ion exchange reaction is performed while stirring at 80° C. for 3 h.

6. The method for preparing a red mud-based composite asphalt anti-aging agent according to claim 4, wherein a method for preparing the silane coupling agent hydrolysate is adding a silane coupling agent into water and stirring same until hydrolysis is completed.

7. A modified asphalt mortar, consisting of the following raw materials in parts by weight: 94-98 parts of asphalt and 2-6 parts of the red mud-based composite asphalt anti-aging agent according to claim 1.

8. The modified asphalt mortar according to claim 7, wherein the asphalt is base asphalt.

9. A method for preparing the modified asphalt mortar according to claim 7, comprising:
heating and melting asphalt, then adding the red mud-based composite asphalt anti-aging agent according to claim 1, and evenly mixing same to obtain the modified asphalt mortar.

* * * * *